United States Patent Office 3,579,540
Patented May 18, 1971

3,579,540
METHOD FOR PROTECTING NONPOROUS SUBSTRATES AND FOR RENDERING THEM WATER REPELLENT
Howard G. Ohlhausen, 82 Graymoor Lane,
Olympia Fields, Ill. 60461
No Drawing. Filed Nov. 1, 1968, Ser. No. 772,856
Int. Cl. C08g 31/02, 51/34
U.S. Cl. 260—33.4                    16 Claims

ABSTRACT OF THE DISCLOSURE

Method and composition for treating nonporous substrates to protect and render same water repellent. A mineral acid is added to a solvent and an alkyl polysiloxane is then added to that mixture to produce the composition. The alkyl polysiloxane has the formula:

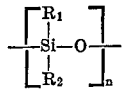

wherein $n$ is an integer greater than 1, $R_1$ is a lower alkyl containing 1–7 carbon atoms and $R_2$ is hydrogen, a lower alkyl containing 1–7 carbon atoms or an aryl radical containing about 6 carbon atoms.

BACKGROUND OF THE INVENTION

This invention relates to a method for treating nonporous substrates, such as glass, metal, ceramics, and plastics, painted or unpainted. More particularly, the invention relates to a method of treating nonporous substrates to render them water repellent.

There is frequently a need to treat a non-porous surface to render the same water repellent. Thus, the effective life, appearance and performance of objects made of such materials as glass, ceramics, metal and plastics, etc., are often adversely affected and degraded by the wetting action of water and foreign particles carried by water. Other adverse effects resulting from the wetting of such substrates by water are impairment of vision, soiling, staining, corrosion, alteration of electrical properties, loss of luster, etc.

The presently available materials for treating non-porous substrates are frequently unsatisfactory and difficult to use for a number of reasons, such as: they are usually effective on only one, or at the most a few, of the surfaces encountered; they may involve the handling of hazardous or toxic solvents or other components; they may require the use of specialized storage and application techniques; they may require careful timing to prevent difficulty of rub-out or streaking of the surfaces being treated; they may require heat curing which cannot be carried out under many actual field application conditions; they may require extensive surface preparation prior to application; and most importantly, they usually lack durability and resistance to solvents and detergents and thus require frequent re-application to maintain the substrate in a water repellent condition.

It is, accordingly, an object of the present invention to provide a novel water repellent composition which can be applied to a great variety of nonporous substrates to render them water repellent.

Another object of the invention is to provide an improved water repellent composition which is completely stable in storage and which has low sensitivity to moisture thus resisting loss of effectiveness and destruction by water contamination.

A further object of the invention is to provide an improved water repellent composition for nonporous substrates which is safe to handle and easy to apply under actual conditions and which requires no special surface preparation prior to application.

Still another object of the invention is to provide a general purpose water repellent composition for nonporous substrates which is economical to use, adherent to a great variety of substrates and remains effective for a long period of time.

These and other objects of the invention can be gathered from a reading of the following disclosure.

SUMMARY OF THE INVENTION

In accordance with the present invention, I provide a method for rendering nonporous substrates, such as glass, ceramics, metal and plastics, etc., water repellent by treating the substrates with a composition containing a mineral acid and an alkyl polysiloxane having the formula:

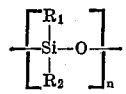

wherein $n$ is an integer greater than 1, $R_1$ is a lower alkyl radical containing from 1–7 carbon atoms, and $R_2$ is hydrogen, a lower alkyl radical containing from 1–7 carbon atoms or aryl radical containing about 6 carbon atoms.

DETAILED DESCRIPTION

The present invention is based on the surprising discovery that when a nonporous substrate is treated with a composition containing a mineral acid and an alkyl polysiloxane of the indicated formula, a strongly adherent and durable water repellent film is formed on the substrate. Even more surprisingly, and of particular advantage, I have found that the treating material used in the process of the present invention can be employed in a diluted form, say a solution of about 5–25% by weight of the active ingredients (alkyl polysiloxane plus acid) in a solvent, which is very economical to use, easy to apply, and results in a durable and effective water repellent film which is extremely adherent to the substrate treated.

The alkyl polysiloxane used in the process of the present invention may be employed alone in the solution form or it may have other compounds and additives advantageously included. As indicated above, the alkyl polysiloxanes used in the process of the present invention have the general formula:

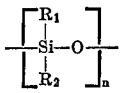

in which $n$ is an integer greater than 1, $R_1$ is a lower alkyl radical containing from 1–7 carbon atoms, and $R_2$ is either a hydrogen, a lower alkyl radical containing from 1–7 carbon atoms, or an aryl radical containing about 6 carbon atoms. Examples of suitable alkylpolysiloxane, include dimethyl polysiloxane, methyl hydrogen polysiloxane, and methyl phenyl polysiloxane, etc. These alkyl polysiloxanes are commercially available in various molecular weight ranges. Although the particular species of the alkyl polysiloxane and its molecular weight most suited for a particular application must be determined from each set of circumstances, I have found that generally a value for $n$ of about 5–900 is preferred. For example, with respect to dimethyl polysiloxane, a molecular weight range of about 400–60,000 is desirable, and more particularly a molecular weight of about 1100 (corresponding to a value of $n$ of about 15) is preferred.

Suitable mineral acid modifiers which can be used in the method of present invention include sulfuric acid, phosphoric acid, aromatic sulfonic acids, aliphatic sulfonic acids and hydrochloric acid. Although the amount of acid which can be used in the treating composition of the invention can be varied widely, I prefer to use an amount of acid equivalent to about 2.5 to 30% based on the weight of the polysiloxane in the treating composition. Generally, an amount of acid over 30% by weight of the polysiloxane is not desirable and would require special care in its handling. However, when an extremely small amount of the alkyl polysiloxane is used in the composition, say 2% by weight, then the relative amount of acid required would be somewhat greater than indicated above. Thus, if 2% dimethyl polysiloxane is employed with isopropyl alcohol as solvent, about 1% acid based on the weight of the overall composition, or 50% based on the weight of the polysiloxane, is needed to activate the composition for the purposes intended. Although an amount of acid less than 2.5% by weight of the polysiloxane will give the substrate treated some water repellency, such small amounts of the acid is not particularly effective. It is particularly preferred that an amount of acid be used which is equivalent to about 5–20% by weight of the polysiloxane. Generally, about 1% by weight of acid, based on the weight of the composition, is preferred.

It is an important aspect of the present invention that the alkyl polysiloxanes used in the method of the present invention can be employed with solvents, diluents and extenders. Such solvents, diluents and extenders are much less expensive than the alkyl polysiloxanes, and permit tailoring of the composition to meet a large variety of application requirements. In addition, solvents, diluents and extenders make the composition of the present invention easier to apply, more stable in storage, safer to handle, etc. The solvents, diluents and extenders which may be used in the method of the present invention include alcohols, chlorinated-hydrocarbons, ethers, ketones, esters, aromatic hydrocarbons, water, colloidal pyrogenic silicas and clays. Examples of such solvents and diluents are benzene, butyl acetate, carbon tetrachloride, ethyl ether, gasoline, hexane, isopropyl alcohol, methyl ethyl ketone, mineral spirits, perchloroethylene, toluene, xylene, etc. Other solvents also may be used. It may be noted that the suitability of a solvent depends in part on the particular alkyl polysiloxane used and intended application. Thus, for example, for general application to the broadest range of substrates, I prefer to use isopropyl alcohol as the solvent. Although high molecular weight, extremely viscous, dimethyl polysiloxanes are not easily solubilized in isopropyl alcohol, I have found that dimethyl polysiloxanes having a viscosity of 5–1000 centistokes can be easily solubilized in isopropyl alcohol using the techniques described herein. Although dimethyl polysiloxanes of higher viscosity can also be solubilized using the described technique, practical considerations limit their use.

The amount of solvent to be used in a composition of the present invention can be varied widely. However, to obtain the optimum balance to properties in terms of water repellency, adsesion to the treated substrates, economy, durability and ease of application, etc., I prefer to use an amount of solvent about 75–95% by weight of the final composition. More preferably, I find that an amount of solvent equal to about 80–90% by weight of the final composition is particularly suitable. I prefer to use an alcohol as the solvent, particularly isopropyl alcohol.

The method of preparing the composition of the invention is very important. I have found that if a dimethyl polysiloxane having a molecular weight above approximately 3,000 is mixed with isopropyl alcohol, the two materials will not immediately result in a solution and they will separate into two phases. If, to this two-phase mixture, the acid is then added, the overall mixture will often remain in a three-phase state due to incompatibility of the acid and the polysiloxane. On the other hand, I have found that by adding the acid to the alcohol, and thereby forming an intermediate half ester, I have a vehicle in which the polysiloxane becomes completely soluble. Thus, if sulfuric acid is added to isopropyl alcohol, an intermediate "half ester" is produced in which the dimethyl polysiloxane is more easily solubilized.

In view of the foregoing discussion, it can be seen that the preferred method for perparing the composition of the present invention is to first add the acid to the solvent and then add the alkyl polysiloxane to the intermediate half ester mixture.

The composition of the present invention can be applied to the non-porous substrate by any conventional means, such as by spraying brushing, wiping and other coating techniques. To insure complete coverage of the substrate, it is preferred to lightly wipe the coated surface with a cloth after the composition is applied. To obtain a surface with an optically clear film coated thereon, excess treating material can be removed by wiping with a clean dry cloth. The treated surface can be polished to obtain a high degree of luster.

The method of treating nonporous substrates by the method of the present invention is extremely useful for a variety of purposes. For example, the windshields of automobiles, boats and airplanes can be treated by the method of the present invention to render the same water repellent and thus by preventing wetting, will present a clear view of the road to a driver without the use of conventional windshield wipers even during a heavy rainstorm. This is particularly advantageous in the case of inoperative windshield wipers and side and rear windows through which vision is usually imparied and restricted during a rainstorm. Windshields coated with a composition of the present invention can also be more easily cleaned of various dirt and foreign materials than windshields not so treated. Thus, it is common knowledge that after a long distance trip, the front windshields are almost invariably soiled by dirt, grease, bugs. etc. which are extremely difficult to completely remove. I have found that after the windshield of an automobile has been treated in accordance with my present process before a long distance trip, such dirt and bugs can be substantially completely removed simply by the use of a standard windshield washer and wiper. This is because the polysiloxane-treated windshield presents a surface on which foreign material does not strongly adhere.

Another example of the utility of the present invention resides in the treating of automobile windows in the winter months. When windows which have been treated in accordance with the method of the present invention are left outdoors over night, the frost and ice gathered on the windows can be more easily removed by conventional techniques than from untreated surfaces.

Other uses of the method and composition of the invention include the treating of glass, metal and ceramic exterior surfaces of buildings and other objects. Such treatment maintains the attractive appearance of such surfaces, protects such surfaces against the corrosion, and renders the surfaces easier to clean.

The invention will be further illustrated by the following specific examples.

Example 1

Compositions for treating nonporous substrates in accordance with the present invention were prepared in the following manner. Sulfuric acid is first added to isopropyl alcohol to form an intermediate solution containing a half ester. To this intermediate solution is then added the algyl polysiloxane which in this example was dimethyl polysiloxane. The amount of sulfuric acid employed was 10% based on the weight of the dimethyl polysiloxane. Final compositions containing 5%, 10% and 20% by weight of active ingredients (dimethyl polysiloxane plus sulfuric acid) were prepared. These compositions were then applied substantially immediately, i.e. within one hour of preparation to cleaned window glass test panels by wiping the panels with cotton cloth saturated with the composition. The wiping action was carried out in a manner to insure complete coverage of the panels. The panels were then allowed to stand for approximately five minutes and then excess material on the panels was removed by wiping with a dry, clean, cotton cloth. Thereafter, the effectiveness of the treatment was tested by spraying the test panels with tap water from a nozzle held at a distance of about 12 inches from the panel. After an appropriate period of time, during which the water spray impinged on all parts of the treated surface area of the test panels, the spraying was discontinued and the panels were visually inspected for presence of water droplets or thin films retained on the test panels. Essentially no films of water were found to be present on the treated surface area of the test panels, and the panels were in a virtually dry, clean and optically-clear condition. It was noted that during the spraying period, the water runs off the treated surfaces much more readily than untreated surfaces.

Portions of the compositions prepared above were separately stored in containers for periods of 24 hours, 72 hours, 7 days and 2 months. At the end of the storage periods, the compositions were used to treat glass test panels and tested in the same manner as above. Essentially the same results as above were obtained in each instance after the storage periods.

Example 2

The procedure of Example 1 was repeated except that an amount of water equal to the amount of active ingredients in each formulation of the compositions of Example 1 was added to the compositions. The water was stirred with solution. Thereafter, the water-containing compositions were applied to glass test panels after storage for the same amount of time as indicated in Example 1. Panels so treated were also found to retain essentially no water film after spraying with water from a nozzle held at a distance of 12 inches from the panels.

The addition of water to the compositions was for the purpose of testing the effect of moisture, which may come into contact with the composition through humidity in the atmosphere or other sources, such as improperly closed containers, on the compositions. The results of this test show that a substantial amount of water, up to 10% based on the weight of the composition has almost no detrimental effect on the water repellent power of the compositions. This is in distinct contrast to some prior art water repellent materials which are adversely affected by contamination by water or water-containing solvents.

Example 3

A composition containing 10% active ingredients was prepared in accordance with the procedure of Example 1. This composition was then applied to painted metallic surfaces, such as automobile fenders, plastic and resinous surfaces, such as the vinyl tops of automobiles, and bare metallic surfaces, such as the chrome strips on the outside of an automobile. The composition was applied to these surfaces in the same manner as indicated in Example 1. After the composition was applied to the substrates, the treated surfaces were tested for water repellency, visual appearance and feel or hand. It was found that essentially no water films were retained by the painted metallic surfaces after treatment with the composition, but the treated vinyl tops and chrome strips showed slightly less water beading. The visual appearance and feel of the treated surfaces were excellent in all cases.

Example 4

The substrates treated in accordance with Examples 1–3 were all tested for resistance to removal by various means; washing with detergents; washing with bleach and ammonia; removal by solvents; soaking in water; high temperatures; freezing and thawing; and aging.

Each of the treated glass test panels was washed for a minimum of 25 wash cycles with various common household and commercial detergents. The detergents were employed in concentrations ranging from one to five ounces per gallon. Each wash cycle was made up of: a washing period wherein the treated glass panels were washed with the detergent solution in a manner similar to the washing of dishes; and a rinsing period in which the treated panels were rinsed with clean tap water. No noticeable loss of water repellency to any of the test panels was found.

The treated glass panels were also subjected to at least 10 wash cycles using household ammonia solutions and household bleach solutions. No reduction in the water repellency of the test panels was observed.

The treated glass panels were also washed with various solvents, including gasoline, kerosene, isopropyl alcohol, ethyl alcohol, mineral spirits and carbon tetrachloride. After contacted by these solvents, the test panels were again tested for water repellency. No reduction in their water repellent properties was found.

The treated glass panels were completely submerged in clean tap water for periods up to 30 days. It was found that such constant contact with water did not reduce the water repellent properties to any noticeable extent. In other words, the test panels retained their resistance to wetting by water, and water spraying onto the panels quickly ran off.

A Pyrex glass beaker was treated with a composition containing 10% dimethyl polysiloxane, 1% sulfuric acid and 89% isopropyl alcohol. The beaker was then completely filled with sand and immersed in a sand bath. The sand bath was heated to a temperature of 240° F. and maintained there for a period of 6 hours. Thereafter, the sand bath was cooled and the beaker removed. There was no loss in water repellent properties on the treated surface of this beaker after the heat treatment. This beaker was then filled with water and placed on a hot plate and heated until about half of the water was evaporated. Again, no loss in water repellency could be observed on the treated surface of this beaker.

The glass panels treated in Example 1 were subjected to at least 10 freezing and thawing cycles. In each of these cycles, the glass panels were placed in the freezing compartment of a refrigerator and were flooded with water in a manner and for a sufficient period of time so that ice would form on the glass panels. Upon their removal, it was found that the ice can be very easily removed from the treated surfaces: by simply brushing or wiping or by pushing with scrapers. After the ice has been removed, the test panels were allowed to come to room temperature before refreezing. No loss of water repellence was observed as a result of such repeated freezing and thawing.

The above examples indicate the wide applicability and effectiveness of the composition and method of the present invention. The composition of the invention has been found to be completely stable in storage for observed period of up to 5 months. When applied to glass surfaces, the composition of the invention forms a highly adherent film which is water repellent and resistant to removal. The film is completely transparent and does not visibly alter any of the optical properties of the glass. Moreover, when successive treatments were applied to the same substrate, there is no visible evidence of film build-up.

Substrates treated in accordance with the method of the invention have been found to be more resistant to abrasion by dirt, bugs and other foreign material than untreated surfaces. Thus, the film of the composition on the treated surface physically protects the surface as well as rendering it water repellent.

In addition to the glass and metal surfaces treated in the above examples, other objects were treated with the composition and method of the invention. These treated objects included storm doors, ceramic sinks and tiles, sterling silver, refrigerator and stove front panels, plastic tiles and vinyl floor coverings. The effective life of the treated surfaces would stand to vary with exposure, conditions of use of the treated objects, and frequency of cleaning. However, in all cases, the effective period for each treatment was well over a month. It should be noted that the treated surfaces were rendered much easier to clean, when compared with untreated surfaces due to the reduced adhesion of the dirt or foreign matter to the substrates.

The invention has been described in detail with reference to particular and preferred embodiments thereof, but it will be understood that variations and modifications can be made within the spirit and scope of the invention as described hereinabove and as defined in the appended claims.

What is claimed is:

1. A process for rendering a nonporous substrate water repellent comprising treating said substrate with a composition consisting essentially of an alkyl polysiloxane having the formula:

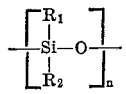

wheein $n$ is an integer greater than 1, $R_1$ is a lower alkyl radical containing from 1–7 carbon atoms, and $R_2$ is hydrogen, a lower alkyl radical containing from 1–7 carbon atoms, or an aryl radical containing about 6 carbon atoms, and a mineral acid selected from the group of sulfuric acid, phosphoric acid, aromatic sulfonic acids, aliphatic sulfonic acid and hydrochloric acid, said acid is present in an amount about 2.5% to 30% based on the weight of said polysiloxane.

2. A process according to claim 1 wherein said composition further contains a solvent, said solvent being present in an amount about 75% to 95% based on the weight of said composition.

3. A process according to claim 1 wherein $n$ has a value about 5–900.

4. A process accordinng to claim 1 wherein $n$ has a value about 15.

5. A process according to claim 1 wherein said acid is sulfuric acid.

6. A process accordingly to claim 1 wherein said alkyl polysiloxane is dimethyl polysiloxane.

7. A process according to claim 1 wherein said alkyl polysiloxane is methyl hydrogen polysiloxane.

8. A process according to claim 1 wherein said alkyl polysiloxane is methyl phenyl polysiloxane.

9. A process according to claim 1 wherein said composition further contains isopropyl alcohol as a solvent.

10. A process according to claim 1 wherein said composition contains about 10% by weight of a dimethyl polysiloxane having an average molecular weight of about 1100, about 1% by weight of sulfuric acid, and about 89% by weight of isopropyl alcohol.

11. A composition of matter for treating nonporous substrates to render the same water repellent consisting essentially of an alkyl polysiloxane having the formula:

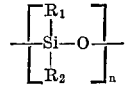

wherein $n$ is an integer greater than 1, $R_1$ is a lower alkyl radical containing from 1–7 carbon atoms, and $R_2$ is hydrogen, a lower alkyl radical containing from 1–7 carbon atoms or an aryl radical containing 6 carbon atoms; a solvent; and a mineral acid, selected from the group of sulfuric acid, phosphoric acid, aromatic sulfonic acids, aliphatic sulfonic acid and hydrochloric acid, said acid is present in an amount about 2.5% to 30% based on the weight of said polysiloxane.

12. A composition according to claim 11 wherein said alkyl polysiloxane is dimethyl polysiloxane, methyl hydrogen polysiloxane or methyl phenyl polysiloxane.

13. A composition according to claim 11 wherein said solvent is isopropyl alcohol.

14. A composition according to claim 11 wherein said solvent is present in an amount about 75% to 95% based on the weight of said composition.

15. A composition according to claim 11 wherein said alkyl polysiloxane is dimethyl polysiloxane and being present in an amount about 10% based on the weight of said composition; wherein said acid is sulfuric acid and being present in an amount about 1% based on the weight of said composition; and wherein said solvent is isopropyl alcohol and being present in an amount about 89% based on the weight of said composition.

16. A method for preparing the composition of claim 11 comprising passing said solvent into a container, slowly adding said acid to said solvent, then adding said alkyl polysiloxane to said mixture with continuous agitation.

References Cited
UNITED STATES PATENTS

| | | | |
|---|---|---|---|
| 2,891,920 | 6/1959 | Hyde et al. | 177—161(ZA)X |
| 2,893,898 | 7/1959 | Evans et al. | 117—161(ZA) |
| 2,895,853 | 7/1959 | Bailey et al. | 117—161(ZA)X |
| 3,009,833 | 11/1961 | Somerville | 260—33.4(Si)X |

MORRIS LIEBMAN, Primary Examiner

L. T. JACOBS, Assistant Examiner

U.S. Cl. X.R.

117—161; 260—46.5

REEXAMINATION CERTIFICATE (174th)

United States Patent [19]

Ohlhausen

[11] B1 3,579,540

[45] Certificate Issued Mar. 20, 1984

[54] METHOD FOR PROTECTING NONPOROUS SUBSTRATES AND FOR RENDERING THEM WATER REPELLENT

[76] Inventor: Howard G. Ohlhausen, 82 Graymoor Ln., Olympia Fields, Ill. 60461

Reexamination Request:
No. 90/000,439, Aug. 30, 1983

Reexamination Certificate for:
Patent No.: 3,579,540
Issued: May 18, 1971
Appl. No.: 772,856
Filed: Nov. 1, 1968

[51] Int. Cl.$^3$ ............................................ C08K 5/42
[52] U.S. Cl. .................................... 523/169; 428/427; 524/157; 524/158; 524/391; 528/12; 528/23

[56] References Cited

U.S. PATENT DOCUMENTS 3,294,725  12/1966  Findlay et al. .................... 260/29.2

FOREIGN PATENT DOCUMENTS

| | | |
|---|---|---|
| 34-10336 | 11/1959 | Japan . |
| 35-9760 | 7/1960 | Japan . |
| 37-8390 | 7/1962 | Japan . |
| 638317 | 6/1950 | United Kingdom . |
| 785174 | 10/1957 | United Kingdom . |
| 902482 | 8/1962 | United Kingdom . |
| 1024024 | 3/1966 | United Kingdom . |
| 1117038 | 6/1968 | United Kingdom . |
| 1199501 | 7/1970 | United Kingdom . |

OTHER PUBLICATIONS

Leznov et al, "Poly(diethylsiloxane) liquids. I and II", *Chemical Abstracts*, 54:9731-32 (1960).

*Primary Examiner*—Paul R. Michl

[57] ABSTRACT

Method and composition for treating nonporous substrates to protect and render same water repellent. A mineral acid is added to a solvent and an alkyl polysiloxane is then added to that mixture to produce the composition. The alkyl polysiloxane has the formula:

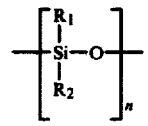

wherein n is an integer greater than 1, $R_1$ is a lower alkyl containing 1-7 carbon atoms and $R_2$ is hydrogen, a lower alkyl containing 1-7 carbon atoms or an aryl radical containing about 6 carbon atoms.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 9 and 11 are determined to be patentable as amended:

Claims 3–8, 10, and 12–16, dependent on amended claims, are determined to be patentable.

1. A process for rendering a nonporous substrate water repellent comprising treating said substrate with a composition consisting essentially of an alkyl polysiloxane having the formula:

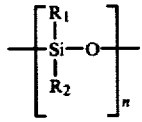

[wheein] *wherein* n is an integer greater than 1, $R_1$ is a lower alkyl radical containing from 1–7 carbon atoms, and $R_2$ is hydrogen, a lower alkyl radical containing from 1–7 carbon atoms, or an aryl radical containing about 6 carbon atoms, *an organic solvent,* and a mineral acid selected from the group of sulfuric acid, phosphoric acid, aromatic sulfonic acids, aliphatic sulfonic acid and hydrochloric acid, said acid is present in an amount about 2.5% to 30% based on the weight of said polysiloxane.

2. A process according to claim 1 wherein [said composition further contains a solvent,] said solvent [being] *is* present in an amount about 75% to 95% based on the weight of said composition.

9. A process according to claim 1 wherein said [composition further contains] *solvent is* isopropyl alcohol [as a solvent].

11. A composition of matter for treating nonporous substrates to render the same water repellent consisting essentially of an alkyl polysiloxane having the formula:

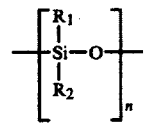

wherein n is an integer greater than 1, $R_1$ is a lower alkyl radical containing from 1–7 carbon atoms, and $R_2$ is hydrogen, a lower alkyl radical containing from 1–7 carbon atoms or an aryl radical containing 6 carbon atoms; [a] *an organic* solvent; and a mineral acid, selected from the group of sulfuric acid, phosphoric acid, aromatic sulfonic acids, aliphatic sulfonic acid and hydrochloric acid, said acid is present in an amount about 2.5% to 30% based on the weight of said polysiloxane.

* * * * *